United States Patent [19]

Massignani

[11] Patent Number: 5,087,358
[45] Date of Patent: Feb. 11, 1992

[54] FILTERING MACHINE FOR FIBROUS SUBSTANCES HAVING REVOLVING CONE-SHADED FILTERS

[76] Inventor: Donato Massignani, Viale Ferrarin 18, Vicenza, Italy

[21] Appl. No.: 564,182

[22] Filed: Aug. 8, 1990

[51] Int. Cl.⁵ .............................................. B01D 33/27
[52] U.S. Cl. ........................................ 210/195.1; 68/1; 69/29; 137/563; 137/571; 210/248; 210/256; 210/257.1; 210/330; 210/497.3
[58] Field of Search ................ 68/1; 69/29; 210/195.1, 210/248, 256, 257.1, 330, 331, 346, 486, 497.01, 497.3, 499, 314, 318, 456; 137/563, 568, 571

[56] References Cited

U.S. PATENT DOCUMENTS

| | | | |
|---|---|---|---|
| 648,073 | 4/1900 | Guttner | 210/497.3 |
| 2,067,415 | 1/1937 | Robinson | 210/248 |
| 3,422,642 | 1/1969 | Jullien et al. | 69/29 |

FOREIGN PATENT DOCUMENTS

| | | | |
|---|---|---|---|
| 0307700 | 8/1988 | European Pat. Off. | 210/404 |
| 0293350 | 11/1988 | European Pat. Off. | 210/331 |
| 3644039 | 6/1988 | Fed. Rep. of Germany | 68/1 |
| 0602884 | 4/1926 | France | 210/486 |
| 1556104 | 12/1968 | France | 210/486 |
| 128339 | 6/1919 | United Kingdom | 69/29 |
| 190437 | 8/1923 | United Kingdom | 69/29 |
| 1002819 | 9/1965 | United Kingdom | 210/486 |

*Primary Examiner*—Robert A. Dawson
*Assistant Examiner*—Joseph Drodge

[57] ABSTRACT

The invention discloses a machine for the filtering of solid, in particular fibrous, particles suspended in liquids, including a delivery chamber (2) collecting the liquid to be treated, a raceway (3) leading the liquid to be treated into a treatment chamber (4) having a cylindrical bottom (5), wherein there is at least one pair of revolving filters (6, 7), an overflow chamber (16) connected with a recycling tank and an area (21) for the discharge of the recovered solid particles. In the machine each filter (12) has a surface in the shape of a truncated cone and its horizontal axis is essentially perpendicular to the flow direction of the liquid to be treated, the two filters are coaxial with each other and face each other, so as to form a concave space (20) therebetween. The taper of the filters causes the double effect of increasing the filtering performance of the machine and of avoiding its standstill when the delivery of liquid to be treated increases.

3 Claims, 2 Drawing Sheets

FILTERING MACHINE FOR FIBROUS SUBSTANCES HAVING REVOLVING CONE-SHADED FILTERS

BACKGROUND OF THE INVENTION

1. Field of the Invention

The invention concerns a machine for filtering solid, especially fibrous, substances contained in suspension in industrial liquids to be treated.

2. Description of Related Art

It is a known fact that some types of industrial processes involve treatment waters which contain in suspension not only chemical agents but also solid compounds. Reference is made particularly to the tanning industry, wherein the industrial to be treated waters contain the hairs from the leather or to the wool-processing industry, also involving hairs and thin fibers. The same occurs in the foodstuff industry, wherein the washing and discharge water must be cleared of the fibrous particles which are present in the foodstuff to be treated.

One of the most widely employed methods for the elimination of these fibrous particles from the waters, prior to their chemical and biological treatment, consists in the use of large sedimentation installations comprising large volume tanks wherein the waste waters lose their speed, so that they allow the suspended solids to settle on the bottom. This method is rather costly, since the construction of these installations involves remarkable expenses and they also require large areas in order to obtain the desired results. Moreover, another limitation of this method arises from the fact that the removal of the sediments is rather difficult, since it can only be carried out after the tanks have been emptied or, worse still, the sediments are mixed with the water.

Another simpler and more effective method involves the use of machines equipped with revolving filters, into which the water to be treated, containing fibrous solid particles flows from a delivery chamber and an inlet raceway, which leads the water to be treated into another treatment chamber, wherein there are two vertically arranged discs facing each other and revolving around a horizontal axis which is perpendicular in relation to the flowing direction of the water to be treated. The discs are completed with filtering elements and the action of the water arriving in a direction which is pratically tangent to the surface of the filtering disc, combined with the revolving action of the disc, generates a resulting force which can be broken out according to a direction tangent to the disc and according to a direction normal to the disc.

The tangential component is practically ineffectual, while the normal component causes the water to flow through the filter, so that the filtering action takes place. During this process of the water flowing into the treatment chamber and during the rotation of the filtering discs a layer of deposited fibers builds up on the filtering surfaces, so that the holes through which the filtered water is discharged become partially clogged. Because of the revolution of the discs, the substances held by the filters between the two discs facing each other are constantly moved and turned over, so that said substances held by the filters slide on the surface of the filters and cause a self-cleaning action of the filter holes. Thus, the clogging of the filter holes is prevented and the filtering action is automatically maintained intact during the entire process. Obviously, as the filtering process progresses, the material exceeding a certain capacity of the tank is expelled through a discharge channel located on the wall of the treatment chamber between the two discs and practically near their center line.

The effect of the rotation of the discs carrying the filters is double.

In fact, on one hand a theoretical but real decrease of the dimensions of the holes for the passage of the discharge water is obtained and, as a consequence, causes an increase in the filtering performance because of the combined action of two factors. The first factor is represented by the fact that, because of the revolving movement of the filter, the filter hole "appears" smaller to the solid particles to be held back, since the rotation causes the window through which the solid particles would pass to appear smaller. The second factor is represented by the fact that the hole is slightly clogged by the layer of substances held back by the filter, so that, for instance, if the grids have holes measuring 250 microns, fibrous particles measuring 200 microns will be held back.

Another effect of the thus conceived and now mentioned machines is the fact that the filter is continuously self-cleaned by the layer of particles held between the filters.

Notwithstanding the considerable progress brought about by these machines in comparison with the sedimentation system, during the practical use a not negligible inconvenience has arisen. For example, when, for reasons depending on the industrial cycles, the amount of water to be treated increases so much, that the exceeding amount is drained through the overflow drainage, the water pressure between the filters decreases and creates whirlpools which cause the mass of substances which was held between the filters and acted as a filter-cleaning element to back up. Thus the machine comes to a standstill, since the self-cleaning effect is missing and it becomes necessary to restore the filtering process by adding some ballast material.

SUMMARY OF THE INVENTION

The main purpose of the present invention is to overcome the above-mentioned inconveniences. The first purpose is the disclosure of a machine wherein the filtering process is not interrupted when the amount of water to be treated increases, not even when the overflow drainage is working.

Another purpose is that of increasing the filtering performance, the amount of water remaining unchanged, so that more fibrous particles are held back, with the holes of the filters maintaining the same diameter. The machine according to the invention will also have the possibility of treating increased amounts of water while its dimensions will remain substantially the same as those of the known machines.

All the above-mentioned purposes and others, which will be better described hereafter are fulfilled by a machine for filtering solid, essentially fibrous particles suspended in liquids which, in accordance with the patent claims, comprises a delivery chamber collecting the liquid to be treated, a raceway for the inlet of the liquid to be treated into a treatment chamber, a treatment chamber with a cylindrical bottom, complete with drainage, wherein there is at least a pair of filters facing each other and revolving around a horizontal axis, an overflow chamber connected with a recycling tank, a chamber for the drainage of the filtered liquid and an area for the discharge of the solid particles recovered and separated from the liquid, wherein said machine is characterized in that each of the filters has a filtering surface with the shape of a truncated cone and a horizontal axis which is essentially perpendicular to the flow direction of the liquid to be treated, said filters being coaxial with each other, and facing each other, so as to form a concave space, and being rigidly connected with a shaft driven by a gearmotor or equivalent means.

Moreover, in the machine according to the invention the water-inlet raceway which connects the delivery chamber with the treatment chamber has containment sides whose height is above the overflow waterline of the overflow chamber.

Advantageously according to the invention the thus conceived machine performs an improved filtering action, increases the amount of the fibrous solid particles held back and also the amount of water filtered within a certain period of time.

Moreover, the machine according to the invention also offers the not-negligible advantage that because of the higher containment sides of the water-inlet raceway, in case the maximum amount of water which can be treated by the machine is exceeded, and therefore, in case the water is discharged into the overflow chamber, the filtering action will not be interrupted and the fibrous particles will not be discharged through the overflow chamber.

Moreover, the tapered shape of the filtering elements, which face each other so as to form a concave chamber, actually increases the volume of the held-back substances, which perform the cleaning action of the filter, thus increasing the cleaning effect of the filter.

This increase in the filter-cleaning action is due to the fact that the normal component of the force of the water mass which acted in the previously mentioned machines presenting flat discs, now acquires a further decreased effectiveness because the force component which is now perpendicular to the tapered surface of the filter is decreased.

Moreover, the tilted position of the filter holes in relation to the inlet direction of the water further decreases the theoretical but effective hole through which the solid particles to be filtered might pass.

Further scope of applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description, and from the drawings, wherein:

DETAILED DESCRIPTION OF PREFERRED EMBODIMENTS

Figure 1:
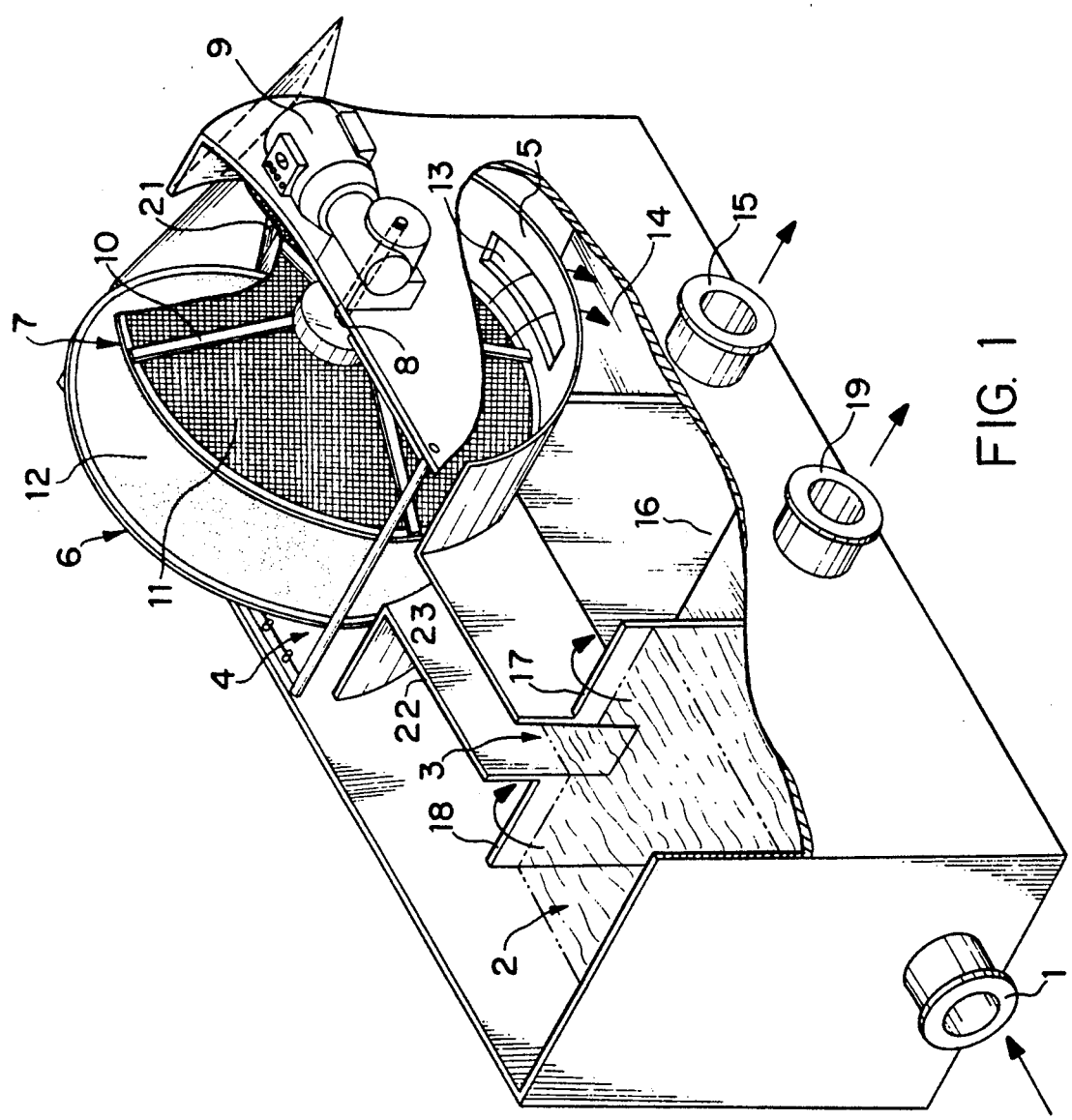
FIG. 1 shows the machine according to the invention in an axonometric view.

With reference to the Figures, the water to be treated, containing in suspension the fibrous particles enters the machine through the flanged inlet pipe 1 and arrives in the delivery chamber, indicated with 2. The delivery chamber 2 has an essentially parallelepiped shape and it has in its upper part a raceway 3 which leads the water to be treated into chamber 4. The chamber 4, as can be observed in the sectional view of FIG. 1, has a cylindrical bottom 5. Two filtering elements 6 and 7 having the shape of truncated cones, face each other and are rigidly connected with a shaft 8, which shaft is driven by a gearmotor 9, 9. The filtering elements 6, 7 rest against said bottom 5 and slide on its surface during their revolving movement. Each of the elements 6 and 7 comprises a supporting structure 10 (only visible in filtering element 7) and consists of four spokes supporting a drilled metal disc 11. The proper filter, indicated with 12 and visible in front of the tapered element 6 in FIG. 1, is laid over the drilled metal disc and fixed around its perimeter. On the bottom 5 of the treatment chamber 4 there are two slits 13 which discharge the filtered liquid into tank 14, through which a drainage pipe 15 is connected with the downstream installation for the recovery or the disposal of the thus treated water.

The machine also comprises an overflow chamber, 16, which receives the water to be filtered overflowing over a walls 17 and 18 of the delivery chamber 2, when the water level exceeds the height of said walls. The overflow chamber 16 has a drainage outlet 19, which is connected through the necessary pipes-not represented in the drawings-with a compensation tank, through which the thus diverted water will be sent again through the treatment cycle through inlet 1.

During the normal working cycle the water to be treated containing the solid particles in suspension reaches the delivery chamber 2 and, through the inlet raceway 3, it reaches the middle of the treatment chamber 4, in the space 20 comprised between the tapered filters 12 of the filtering elements 6 and 7.

After the machine has been in operation for a certain period of time, a uniform layer of fibrous particles will settle on the tapered filtering surfaces 12 and partially clog the filtering holes. At the same time some fibrous particles held by the filters will also settle in the space 20 comprised between the filtering elements 6 and 7. This mass of fibrous particles causes the known self-cleaning effect of the filters 12 of the tapered filtering elements 6 and 7, so that only a fibrous layer adhering to the filtering elements will be maintained and its thickness will be such that the holes through which the water sips will never be completely clogged, but will always be in a correct working condition, holding back the fibrous particles.

It is important to remark that the taper of the filtering elements 6 and 7 as whole and of the filters 12, as a consequence, which creates a concave chamber 20, allows the formation of an accumulated mass of fibrous particles which is larger than the corresponding mass accumulating in similar machines of the same dimensions, and treatment capacity having flat discs.

The build-up is made easier by the fact that, as has been said, the normal component to the surface of the filter of the active force of the liquid mass is now decreased because of the tilted filtering surface which is due to its taper. Thus the self-cleaning potential of the filters increases, since a more voluminous fibrous mass is available. The result of this effect is that the power and the overall dimensions of the machine remaining equal, its capacity to treat the waters increases.

For instance, it has been proven with tests that a machine equipped with filtering elements in the shape of truncated cones as per the invention and with filters having an inclination of approximately 11 degrees, can dispose of a quantity of liquid increased by 20% in comparison with the amount treated by a machine having the same power and overall dimensions.

Figure 2:
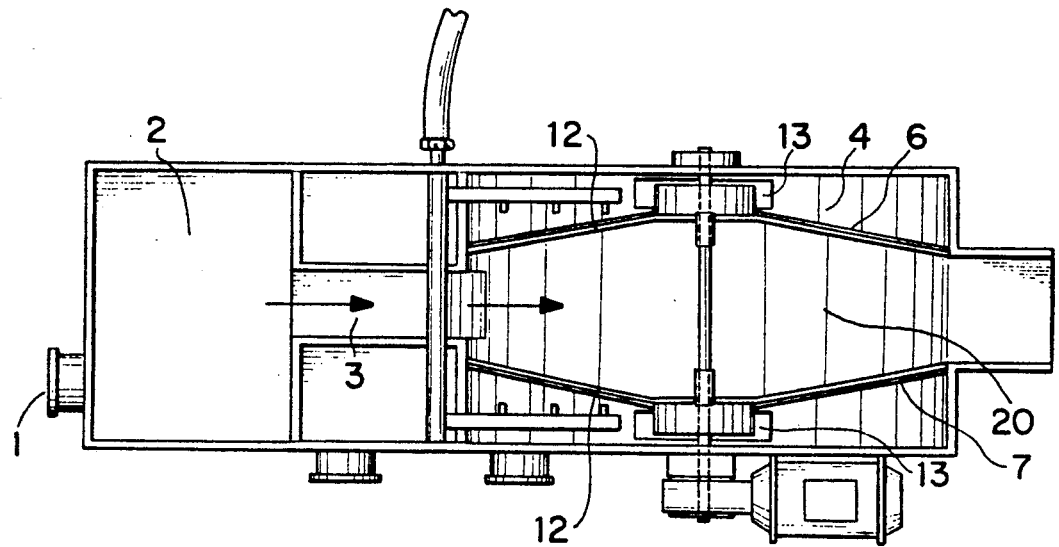
FIG. 2 shows the machine according to the invention seen from the top.
Figure 3:
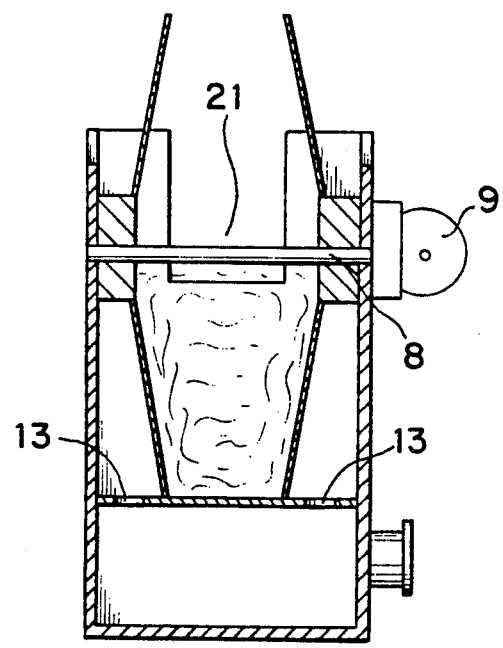
FIG. 3 is a cross-section taken along the III—III line of the machine represented in FIG. 2.

As has previously been described, the filtered water without the fibrous particles which are held back in the space 20, is drained through the slits 13 into the discharge chamber 14 and is then conveyed to the exterior through the outlet opening 15. When the solid fibrous particles collected in the space 20 reach such a volume that their thickness reaches approximately the middle line between the filtering cones, they are discharged through a discharge chute 21, which is located between the two cones 6 and 7 on the wall which is transversal in relation to them and at the end of the machine, as can be observed in the FIGS. 2 and 1. When the delivered amount of water to be treated exceeds the amount which the machine can treat, the water arriving in the inlet chamber 2 exceeds the normal level, it overflows over the top of the walls 17 and 18 and flows into the overflow chamber 16. However, the presence of the higher sides 22 and 23 of the inlet raceway 3 permits maintenance of a water head which slightly exceeds the level corresponding to the top line of the walls 17 and 18, due to the containment capacity of the higher sides 22 and 23.

This increased delivery reaching the treatment chamber 4 is assimilated by the mass of fibrous particles collected in the space 20 between the tapered elements 6 and 7, so that the effect of the fibrous particles backing up does not take place, as was the case in the machines having flat discs, as has previously been mentioned.

Therefore, the presence of the higher sides 22 and 23 of the inlet raceway 3 improves the performance of the machine, since it insures the continuity of operation regardless of the delivery conditions. The excess water which is collected in the overflow chamber 16 is obviously brought back into the cycle and treated again.

Thus it has been disclosed how all the proposed purposes have been fulfilled. The purpose of obtaining a higher treatment capacity, the diameter of the filtering holes remaining equal, has been achieved.

The purpose of increasing the self-cleaning performance of the filters has also been achieved due to the presence of a larger volume of fibrous particles held back between the filters and insisting on them.

The continuity of operation of the machine has also been achieved, since the machine itself is not influenced by the delivery variations and there is no possibility for the layers of fibrous particles collected between the filters and lying on them to be scattered.

Tests run on the machine have shown that with a grid of holes measuring 250 microns, fibrous particles measuring as little as 150 microns are held back while the smallest particles held back by a machine with flat discs measure 200 microns at least.

I claim:

1. A machine for the filtering and treatment of solid particles suspended in liquids, comprising a delivery chamber (2) collecting the liquids to be treated, a raceway (3) connecting the delivery chamber with a treatment chamber (4) and defining a flow direction, the treatment chamber (4) having a cylindrical bottom (5), and containing at least a pair of revolving filters (6, 7), an overflow chamber (16) arranged to receive overflow from the delivery chamber connected with a recycling tank, an area (21) arranged to receive discharge of recovered solid particles which have been separated from liquid by the filters, characterized in that each of the filters (12) has a surface shaped as a truncated cone, with a horizontal axis which is essentially perpendicular to a direction of said flow direction, said two filters being coaxial with each other and facing each other, so as to form a concave space (20) therebetween, said pair of filters being rigidly connected with a shaft driven by a gearmotor (19) or by equivalent means.

2. A machine according to claim 1, characterized in that the raceway (3) has containment sides (22, 23) whose heights exceed the level of the overflow chamber.

3. A filtering machine according to claim 1, characterized in that each filter (12) has a conical taper of approximately 11 degrees.

* * * * *